June 30, 1959 D. B. NICKERSON 2,892,663
PUMP BEARING ASSEMBLY
Filed April 8, 1957

DOUGLAS B. NICKERSON
INVENTOR.

BY *Lyon & Lyon*

ATTORNEYS

United States Patent Office 2,892,663
Patented June 30, 1959

2,892,663

PUMP BEARING ASSEMBLY

Douglas B. Nickerson, Pasadena, Calif., assignor, by mesne assignments, to Crane Co., Chicago, Ill., a corporation of Illinois Application April 8, 1957, Serial No. 651,467

1 Claim. (Cl. 308—72)

This invention relates to a pump bearing assembly and more particularly to a bearing especially designed for a fuel booster pump for aircraft and the like wherein the bearing is normally lubricated by the fuel being pumped but which must be capable of running dry over extended periods of time without overheating.

It is one object of this invention to provide a bearing which can run dry for an extended period of time without seizing to the associated spindle or shaft.

It is a further object of this invention to provide a bearing of the type described which is self-aligned.

It is a further object of this invention to provide a self-aligning bearing of the type described which takes advantage of the difference of the coefficients of thermal expansion between steel and aluminum in order to provide a dry bearing which will not seize to the associated shaft upon heating of the bearing.

These and other objects, features and advantages will be apparent from the annexed specification, in which.

Figure 1:
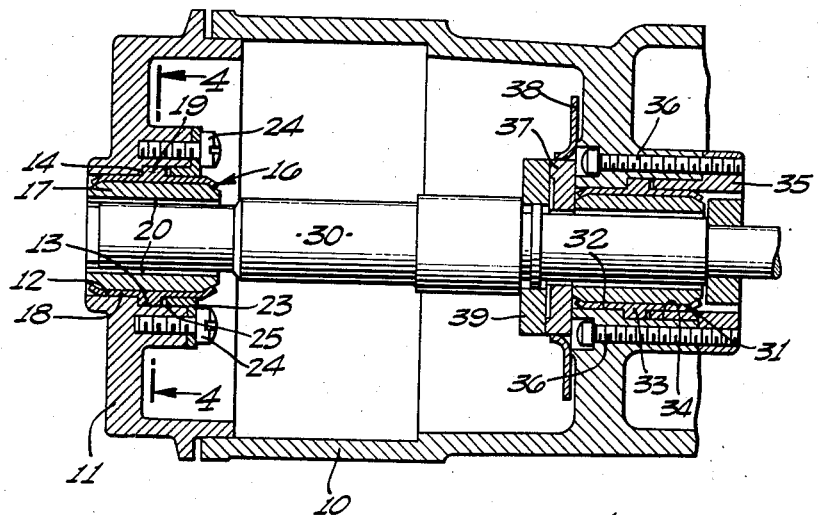
Figure 1 is a section through the portions of a fuel booster pump housing the spindle bearings.
Figure 2:
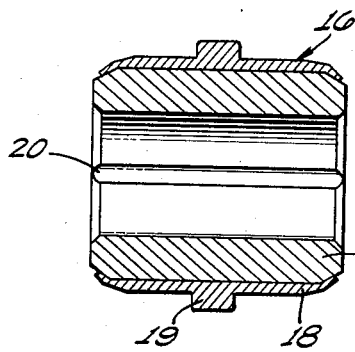
Figure 2 is a section through the bearing assembly per se.
Figure 3:
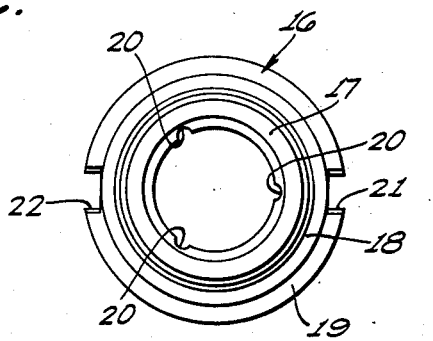
Figure 3 is an end view of the device shown in Figure 2.

Referring now more particularly to the drawings, in Figure 1 there is shown a portion of a booster pump including a housing 10 provided with a cap 11, which cap 11 is provided with a central bore 12 which is enlarged as at 13, providing a shoulder 14. A bearing assembly 16 is provided comprising a graphite bearing member 17 and a bearing sleeve 18 having a central rib 19. The graphite bearing 17 is provided with three radially spaced lubricant slots 20, and the rib 19 is provided with a pair of diametrically opposed slots 21 and 22. The bearing assembly 16 is assembled by heating the bearing sleeve 18 to approximately 500° F. and then pressing the same over the graphite bearing 17, all prior to machining or anodizing. This places the graphite bearing 17 under compression with the result that should the bearing heat up due to running dry, the heat transferred through the bearing to the sleeve 18 will permit the sleeve 18 to expand radially and at a greater rate of expansion than the associated spindle due to the greater coefficient of thermal expansion. As a matter of fact, there will be more heat on the spindle than on the sleeve but this is compensated for in the difference in the rate of expansion. The expansion of the sleeve 18 permits an expansion of the graphite bearing 17 as the same has been initially compressed by the pressing on of the heated sleeve 18.

The condition in which the bearing sleeve 18 is applied in a heated and hence expanded condition, therefore upon cooling seizes and compresses the graphite bearing 17, is herein defined as "hoop tension."

The bearing assembly 16 is placed in the bore 12 with the rib 19 abutting the shoulder 14 as shown in Figure 1. A bearing retainer 23, in the shape of a flanged ring, is seated in the enlarged bore 13 and retained therein by screws 24. It will be noted that there is a slight clearance permitted between the end 25 of the bearing retainer and the rib 19 of the sleeve so that in effect the sleeve 18 is supported solely upon the rib 19. This permits a certain amount of movement of the bearing sleeve 18 and associated bearing 17 and assures that the same will be self-aligning upon the associated spindle. This minimizes heating of the bearing and cooperates with the aforesaid method of forming the bearing assembly to attain the overall end of forming a fuel booster pump, bearings of which can run dry over extended periods of time.

The pump includes a spindle 30 and a second bearing assembly 31, in all respects similar to the bearing assembly 16, for the other end of the spindle. The second bearing assembly 31 is retained in a bore 32 in the housing 10 with its rib 33 seated in an enlarged bore 34 and retained therein by a bearing holder 35, similar in function to the bearing holder 23, retained therein by screws 36. Again the inner end of the bearing holder is spaced slightly from the rib 33 to permit the self-aligning feature above described. Associated with the bearing 31 is a thrust plate 37, a thrust plate holder 38 and a collar 39 attached to the shaft or spindle 30.

Figure 4:
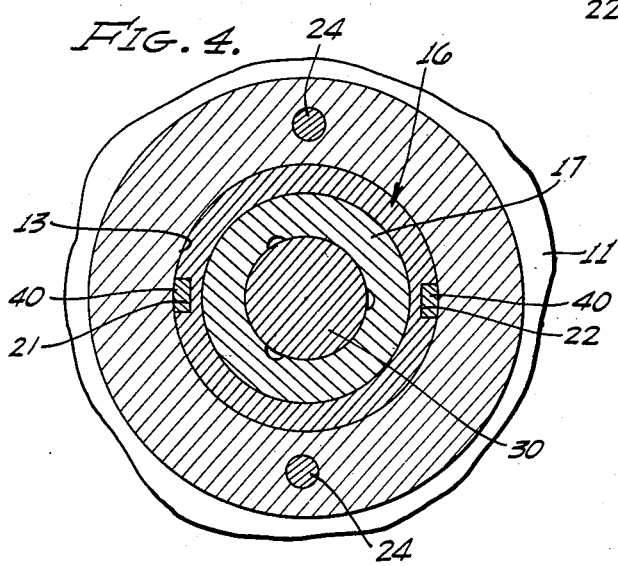
Figure 4 is a section taken along the line 4—4 of Figure 1.

As shown in Figure 4, keys 40, placed in slots 21 and 22, prevent rotation of the bearing assemblies.

While there has been described what is at present considered the preferred embodiment of the invention, it will be understood that various changes and alterations may be made therein without departing from the essence of the invention and it is intended to cover herein all such changes and alterations as come within the true scope and spirit of the annexed claim.

I claim:

A bearing assembly comprising: a graphite bearing and an aluminum sleeve engaging said bearing under hoop tension whereby said bearing is compressed and may expand upon relaxation of the compression upon thermal expansion of said sleeve; said sleeve having a thin radially extending circumferential rib intermediate its ends; said rib having a slot formed therein for engagement by a key to prevent rotation of said bearing; a housing for said bearing having a cylindrical bore; an enlarged section of said bore forming a shoulder adapted to be engaged by one side of said rib and a bearing retainer removably seated in said enlarged section, there being clearance between said bore and bearing sufficient to permit self-alignment of said bearing in said housing about said rib as a pivot.

References Cited in the file of this patent

UNITED STATES PATENTS

| | | |
|---|---|---|
| 499,012 | Cooper | June 6, 1893 |
| 1,019,424 | Clough | Mar. 5, 1912 |
| 2,530,323 | Boyd | Nov. 14, 1950 |
| 2,574,318 | Burkhardt | Nov. 6, 1951 |
| 2,819,932 | Walker | Jan. 14, 1958 |